June 2, 1931.  T. B. THURMAN  1,807,676
AWNING BRACKET
Filed Dec. 13, 1928
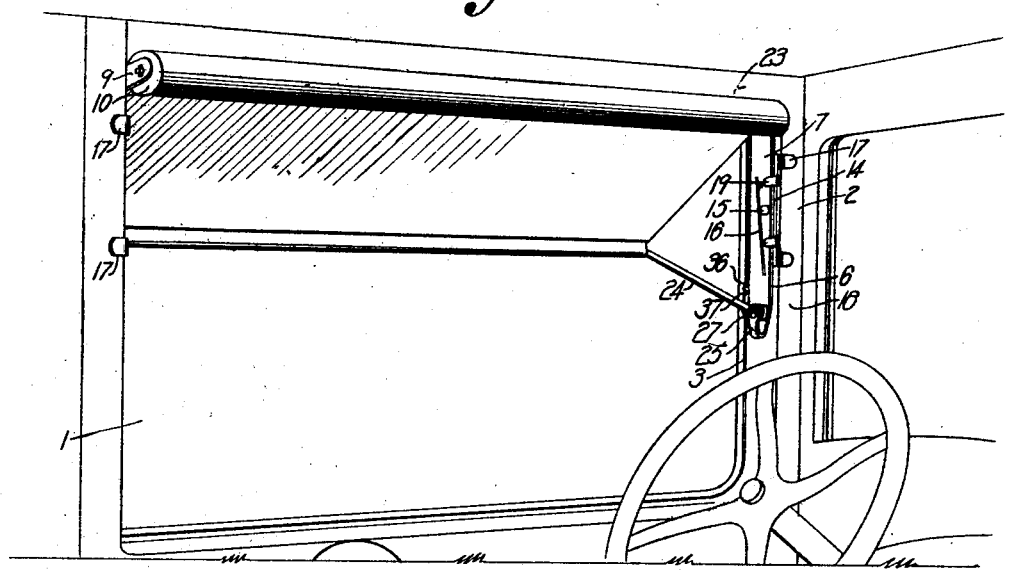
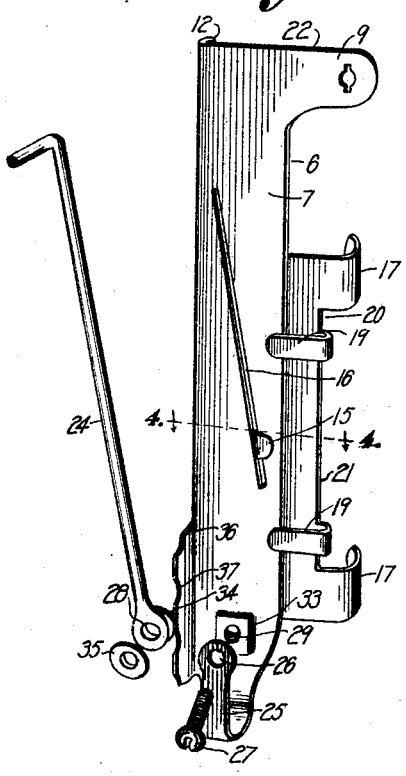
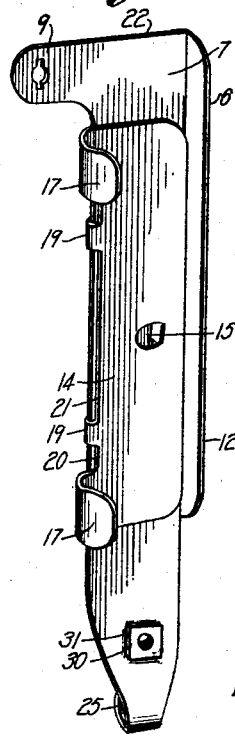
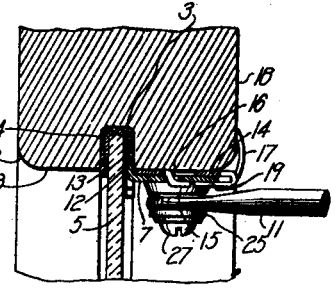
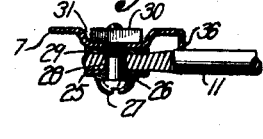
INVENTOR.
Tandy B. Thurman
BY Arthur E. Brown
ATTORNEY Patented June 2, 1931

1,807,676

UNITED STATES PATENT OFFICE

TANDY B. THURMAN, OF KANSAS CITY, MISSOURI

AWNING BRACKET

Application filed December 13, 1928. Serial No. 325,860.

My invention relates to brackets and more particularly to devices of that character for supporting awnings in automobile windows, the principal objects of the invention being to provide easily operable means for securely mounting a bracket on a casing, to clamp a bracket to the casing and dispense with screws for mounting an awning bracket, to frictionally secure a bracket to a casing in such a manner that operation of the awning will enforce the engagement of the supporting means, and to provide easily operable means for pivotally supporting an awning bail on a bracket and adjusting the frictional latching of the pivotal bail.

In accomplishing these and other objects of the invention, I have provided improved details of structure, the preferred forms of which are illustrated in the accompanying drawings, wherein:

Fig. 1 is a perspective view of a portion of an automobile including a window and an awning supported by my improved bracket in the window.

Fig. 2 is an enlarged perspective view of one of the brackets and a portion of a bail arm detached therefrom, illustrating the slidable latch for attaching the bracket to the casing in retracted position.

Fig. 3 is a similar perspective view of the bracket from the opposite side to that shown in Fig. 2 and illustrating the latching member in plate-securing position.

Fig. 4 is a cross-section of the bracket and casing on which the same is mounted including adjacent portions of the bail and the window glass.

Fig. 5 is a cross-section of the lower end of the bracket illustrating the means for pivotally supporting and frictionally latching the awning bail.

Referring in detail to the drawings:

1 designates an automobile window including a side casing 2 having a vertical groove 3 in which felt packing 4 is installed to receive a window glass 5.

My invention comprises a bracket generally designated 6 and including a plate 7 adapted for mounting on the face 8 of the casing, and having an arm 9 at its upper end to receive and support the end of an awning roller 10, and provided with means at its lower end for pivotally supporting the branch 11 of an awning bail, all of which will be particularly described.

The plate 7 has a right-angularly extending flange 12 on one longitudinal edge adapted to be inserted in the casing groove between the felt lining 4 and the groove wall 13, and a clamping member 14 has a retainer or plate-engaging hook 15 slidable in a slot 16 extending longitudinally in the plate and angularly to the flange 12, and hooks 17 on a longitudinal edge extending in the same direction as the flange 12 to engage the face 18 of the casing parallel with the groove wall 13, whereby the clamp 14 may be moved longitudinally of the mounted plate 7 to engage the hooks 17 with the face 18 of the casing and clamp the plate to the casing.

The clamp 14 preferably comprises a plate having the retainer 15 outstruck from a longitudinally central position thereon, and integral guide clips 19 back-bent over the side of the clamp over which the retainer 15 extends and in an opposite direction thereto for engagement with the outer surface of the plate 7 to retain the clamp in parallel relation with the plate.

The clamp is preferably formed by cutting notches 20 in the outer longitudinal edge of a blank to form the hooks 17, and further cutting away said longitudinal edge as at 21 to provide the longitudinally spaced clips 19. The hooks 17 are then bent in one direction for engaging the casing and the clips are bent in the other direction to engage the plate 7 and guide the clamp when moved slidably along the plate. The retainer 15 and clips 19 are suitably spaced to permit the clip to slide in the slot 16 for moving the clamp longitudinally of the plate into clamping position.

I particularly form the clamp hooks 17, and provide the clamp of such material, that the hooks may be shaped and unshaped to conform to the shape of the side casing, and to assure engagement of the clamp with the casing when the bracket plate flange is mounted in a casing groove. The ends of the hooks 17 may be inbent to engage the casing.

I further preferably produce the slot 16 in the plate 7 with its upper end adjacent the flange 12 and inclining downwardly toward the opposite edge of the plate, so that, when the bracket is moved upwardly in the casing groove and its upper edge 22 is in engagement with the upper casing member 23, and the clamp is moved toward clamping position, the plate will be retained by the upper casing member against the tendency of the clamp to dislodge it, and operation of the awning will not tend to release the clamp.

My improved means for pivotally supporting an arm 24 of a swinging awning bail includes a finger 25 resiliently supported at the lower end of the plate 7 and having an opening 26 to receive a bolt 27, the bail arm being provided with an opening 28 at its end so that the bolt may be passed through the finger and bail arm into an opening 29 of the plate for pivotally supporting the bail.

I further provide a nut 30 mounted in a recess 31 in the inner surface of the plate 7 to thereby latch the nut against rotation, and I preferably form and bend the lower end of the plate 7 to form the resilient finger 25, which provides a locking element for preventing the bolt from working loose in the nut 30.

The recess 31 preferably comprises a squared depression in the plate forming a boss 33 on the opposite face thereof to receive a washer 34, and a second washer 35 may be positioned on the opposite side of the bail arm whereby the bail is pivotally supported and frictionally latched in spaced relation with the bracket plate.

The lower end of the plate 7 on the side carrying the flange 12 is also provided with a laterally extending flange 36 extending from the outer face of the plate and which is provided with a plurality of spaced notches 37 for engaging the awning bail, to retain it in adjusted position.

A device constructed as described may easily be mounted in a window casing, the plate flange being inserted between the felt lining and the wall of the groove and moved upwardly to engage the upper transverse edge of the plate with the lower edge of the horizontal casing member. The clamp 14 may then be moved upwardly to clamp the plate to the casing and the engagement of the clamp may be enforced, for example by striking the lower end thereof with a hammer, since the plate is retained by the casing member against possible movement by the advancing clamp.

The awning bail may be easily and conveniently installed on the plate, the countersunk nut being substantially recessed to permit the inner face of the plate to be flat against the casing, the boss spacing the bail from the plate, the resilient finger providing for adjustment of frictional engagement of the awning bail, and the completely assembled device requiring no screws to be inserted in the casing and having relatively few loose parts which may be lost or require attention.

Attention is particularly called to the angular position of the slot in the bracket plate whereby downwardly exerted pressure on the plate due to operation of the awning will tend to enforce the engagement of the clamp with the casing to more securely latch the plate to the casing.

What I claim and desire to secure by Letters Patent is:

1. An awning bracket comprising a plate having a flange engageable in a window casing groove and a longitudinal slot extending angularly to the flange, and a clamp having a hook to engage the face of the casing and a retainer slidable in the slot for clamping the plate to the casing.

2. In an awning bracket including a plate having a roller-supporting arm and a bail-supporting portion and a flange on one edge of the plate for mounting in a casing groove, a clamp having a retainer slidably engaged with the plate and movable therealong for clamping the plate to the casing.

3. In an awning bracket including a plate having a roller-supporting arm and a bail-supporting portion, a flange on one edge of the plate for mounting in a casing groove, and a clamp engaged with the plate and movable longitudinally thereof, said clamp having a hook adapted to bear against the casing oppositely to the flange upon movement of the clamp in one direction for clamping the plate to the casing.

4. In an awning bracket, a plate having a flange on one edge to engage one face of a casing, and a longitudinal slot extending angularly to the flange, and a clamp having a retainer slidable in the slot, and a hook engageable with the opposite face of the casing to latch the plate to the casing.

5. In an awning bracket, a plate having a flange on one edge to engage a casing, and a hook extending parallel to the flange and slidably engaged with the plate, the hook being movable longitudinally of the plate into engagement with the casing to clamp the plate to the casing.

6. In an awning bracket, a plate having a flange on one edge to engage in a casing groove, and a flexible hook extending parallel to the flange and slidably engaged with the plate and movable along the plate into engagement with a casing surface to clamp the plate to the casing, the hook being adapted for forming to enable the same to engage the casing when moved along the plate.

7. In an awning bracket, a plate provided with means for mounting on a casing, and bail-supporting means comprising a back-turned finger at the lower end of the plate spaced therefrom to receive a bail and having a bolt-receiving opening, an apertured bail mounted between the finger and the plate, the plate having an opening to receive a bolt passed through the finger and the bail for pivotally supporting the bail, and a bolt mounted in said openings.

8. In an awning bracket, a plate provided with means for mounting on a casing, and bail-supporting means comprising a resilient back-turned finger at the lower end of the plate having a bolt-receiving opening, a nut countersunk in the plate in registry with said finger opening, and a bolt passed through the finger and the bail and engaged with the nut for pivotally supporting the bail.

9. In an awning bail support of the character described, a plate adapted to be mounted on a side casing and having an outwardly upwardly turned portion provided with a bolt-receiving opening, a recess in the inner face of the plate forming a boss on the outer face thereof and having an opening registering with the opening of the upturned portion, screw-threaded means in said recess for receiving a bolt, and a bolt adapted to be passed through the opening of the upturned portion and the end of the bail into the boss screwthreaded means for pivotally supporting the bail.

10. In an awning bracket of the character described, a plate adapted to be mounted on a side casing for supporting an awning roller and having an outwardly upwardly turned lower portion provided with a bolt-receiving opening, a recess in the inner face of the plate forming a boss on the outer face thereof and having an opening registering with the opening of the up-turned portion, a nut secured to the plate in said recess, and a bolt adapted to be passed through the opening of the upturned portion and the end of the bail into the boss and nut for pivotally supporting the bail.

11. In an awning bracket of the character described, a plate adapted to be mounted on a side casing and having an outwardly upwardly turned lower end provided with a bolt-receiving opening, a recess in the inner face of the plate forming a boss on the outer face thereof and having an opening registering with the opening of the up-turned portion, a nut secured to the plate in said recess, and a bolt adapted to be passed through the opening of the upturned portion and the end of the bail into the boss and nut for pivotally supporting the bail.

12. In a device of the character described, a plate, means including a clamp engaged with the plate and movable therealong into engagement with the casing for clamping the plate to the casing.

13. In a device of the character described, a body member, a finger connected to the body member, a boss on the body member, a bail having an apertured portion located between the finger and the boss, and means including a member extending through the aperture of said bail portion for pivotally supporting the bail.

14. In a device of the character described, a plate adapted for mounting on a casing and provided with a boss, a bail having an apertured portion engaging said boss, and means including a member extending through the aperture of the bail for pivotally supporting said bail.

In testimony whereof I affix my signature.

TANDY B. THURMAN.